United States Patent [19]

Tada et al.

[11] Patent Number: 4,862,367

[45] Date of Patent: Aug. 29, 1989

[54] AUTOMATIC SPEED CONTROL APPARATUS FOR CONTROLLING VEHICLE SPEED AT SET SPEED

[75] Inventors: Tetsuya Tada, Anjo; Masumi Nagasaka, Toyota; Kouji Iwamoto, Toyota; Tatsuo Teratani, Aichi; Junji Takahashi, Kobe; Akira Miyazaki, Kobe; Masaki Hitotsuya, Kobe; Kiyoshi Yagi, Kobe, all of Japan

[73] Assignees: Toyota Jidosha Kabushiki Kaisha, Aichi; Fujitsu Ten Kabushiki Kaisha, Hyogo, both of Japan

[21] Appl. No.: 154,310

[22] Filed: Feb. 10, 1988

[30] Foreign Application Priority Data

Mar. 20, 1987 [JP] Japan .................. 62-066728

[51] Int. Cl.⁴ .............. B60K 31/04; F02M 39/00; F02M 23/06
[52] U.S. Cl. .............. 364/426.04; 123/325; 123/344; 123/352; 180/178; 364/431.07
[58] Field of Search .......... 123/325, 417, 339, 342, 123/352, 326, 558; 364/426.04, 431.07; 180/277–179

[56] References Cited

U.S. PATENT DOCUMENTS

| | | | |
|---|---|---|---|
| 4,381,746 | 5/1983 | Miyagi et al. | 123/339 |
| 4,472,777 | 9/1984 | Youngblood | 364/426 |
| 4,479,184 | 10/1984 | Nakano | 364/426.04 |
| 4,479,186 | 10/1984 | Takao et al. | 123/339 |
| 4,560,024 | 12/1985 | Noda et al. | 123/352 |
| 4,591,986 | 5/1986 | Nakajima et al. | 123/352 |
| 4,597,369 | 7/1986 | Yasuhara | 123/458 |
| 4,700,676 | 10/1987 | Harashima et al. | 123/339 |
| 4,705,001 | 11/1987 | Daimo et al. | 123/417 |
| 4,707,792 | 11/1987 | Naiton | 123/352 |
| 4,709,674 | 12/1987 | Bianchi et al. | 123/325 |
| 4,716,871 | 1/1988 | Sakamoto et al. | 123/339 |

FOREIGN PATENT DOCUMENTS 60-135334 7/1985 Japan .

Primary Examiner—Felix D. Gruber
Attorney, Agent, or Firm—Oliff & Berridge

[57] ABSTRACT

An automatic speed control apparatus for controlling the running speed of a vehicle at a constant set speed includes an auxiliary intake passage providing direct communication between portions of a main intake passage upstream and downstream from a throttle valve so as to bypass the throttle valve, an auxiliary intake air valve adapted for controlling the flow rate of air in the auxiliary intake passage, and a fuel supply cut-off means for suspending the supply of fuel to the engine from a moment at which a fuel supply cut-off condition is met, which requires the throttle valve to be set at the minimum opening position and the engine speed to be higher than a predetermined fuel supply cut-off engine speed, until the moment at which a predetermined fuel supply recovery condition is met. An actuator for actuating the throttle valve is controlled so as to vary the degree of opening degree of the throttle valve and enable the vehicle to run at the constant set speed. The auxiliary intake air valve is controlled in such a manner that the flow rate of air in the auxiliary intake passage is reduced before the fuel supply cut-off condition is met during motion of the vehicle under the control of the automatic driving apparatus. The rate of fuel supply to the engine has therefore been reduced before the fuel supply is actually cut-off so that the amount of change in the engine output torque and, hence, the level of shock produced by the change in the engine output torque are reduced when cut-off of the fuel supply is executed.

24 Claims, 11 Drawing Sheets

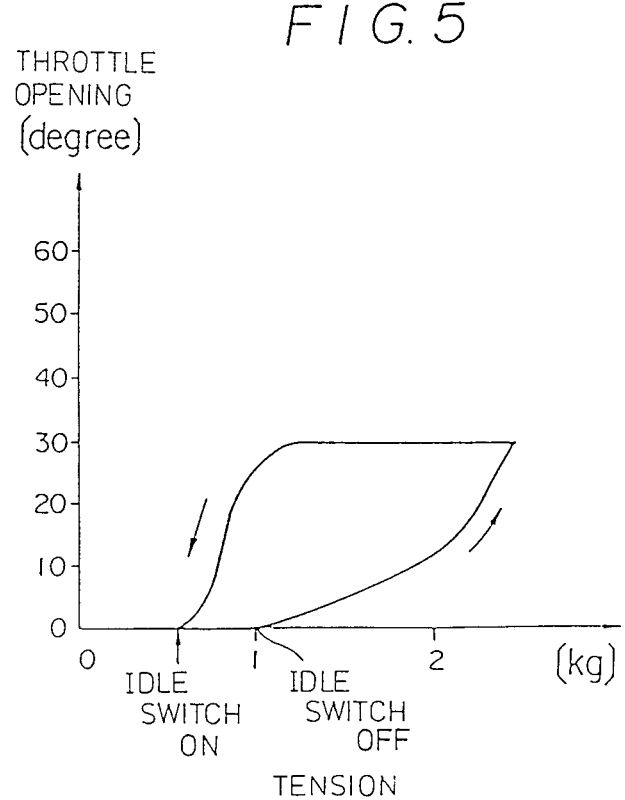

AUTOMATIC SPEED CONTROL APPARATUS FOR CONTROLLING VEHICLE SPEED AT SET SPEED

BACKGROUND OF THE INVENTION

1. Field of the Invention

The present invention relates to an automatic speed control apparatus for enabling a vehicle such as an automobile driven by an internal combustion engine to run at a constant set speed. More particularly, the invention is concerned with an automatic driving apparatus of the type having a main intake passage leading to an engine, an auxiliary intake passage which directly connects a portion of the main intake passage upstream of a throttle value and a portion of the same downstream of the throttle valve, an auxiliary intake air control valve disposed in the auxiliary intake passage and adapted for controlling flow rate of air flowing through the auxiliary intake passage, and a fuel supply cut-off means which suspends the supply of fuel to the engine from a moment at which a condition is sufficed such that the engine speed is higher than a predetermined fuel supply cut-off engine speed while the throttle valve opening is minimum until a moment at which a predetermined fuel supply recovery condition is met, thereby regulating the running speed of the vehicle.

2. Related Art Statement

Hitherto, an automatic driving apparatus has been known which comprises a speed setting means for setting a desired vehicle running speed by way of a set switch, means for computing the offset of the actual vehicle speed from the set vehicle speed, and an electromagnetic throttle actuator to which electric power of a duty ratio is supplied and controlled in accordance with the computed speed offset so as to control the opening of a throttle valve and enable a constant running speed. Usually, the internal combustion engine combined with this type of speed control apparatus has a fuel injection controller which controls the rate of injection of fuel by way of fuel injection time TAU determined as TAU=K.Q/NE, where Q, NE and K represent, respectively, the intake air flow rate, engine speed and a constant. The fuel injection controller has two functions: namely, a fuel supply suspending function which suspends the fuel supply to the engine from a moment at which a condition is sufficed such that the engine speed is higher than a predetermined fuel supply cut-off engine speed while the throttle valve opening is minimum, and a fuel supply recovery function which recovers the fuel supply when a condition is met such that the engine speed has become lower than a predetermined fuel supply recovery speed, the engine speed has become lower than the fuel supply cut-off engine speed while the throttle valve opening is minimum, or the throttle valve opening is increased during the suspension of the fuel supply. The engine is also provided with an auxiliary intake passage which bypasses the throttle valve so as to directly connect portions of the main intake passage upstream and downstream of the throttle valve, and an idle speed control valve (ISC valve) provided in the auxiliary intake passage adapted to vary its degree of opening so as to control the flow rate of air in the auxiliary intake passage and thus maintain a predetermined engine speed during idling. The degree of opening of the ISC valve attained during idling is maintained even while the vehicle is in motion.

When a vehicle runs down a long descending slope, the vehicle having the vehicle speed control apparatus described above combined with an engine equipped with the above-described fuel injection controller and the auxiliary intake passage, the automatic speed control apparatus will operate to minimize the throttle opening, i.e., to fully close the throttle valve, because of the increasing the vehicle running speed due to inertia. If the engine speed in this state is higher than the aforementioned fuel supply cut-off engine speed, the fuel injection controller operates to stop the injection of fuel. As a result of the fuel supply cut-off, the engine output torque is drastically decreased from a point A to a point B on a solid-line curve as shown in FIG. 2, so that the vehicle is shocked undesirably. The vehicle speed is also decreased to a level below the speed set in the speed control apparatus as a result of suspension of the fuel supply. In this way, the speed control apparatus operates to control the throttle valve and recover the set vehicle speed. More specifically, the throttle valve is moved from the fully closed position to a greater degree of opening. This activates the fuel supply recovery function of the fuel injection controller so as to start the supply of the fuel. Consequently, output torque of the engine is cylically varied due to repetitive functioning of the fuel supply cut-off and fuel supply recovery functions. Such a cyclic variation of the engine output torque causes the driving system to vibrate, resulting in a phenomenon known as "surging" which imparts an unpleasant feel to the driver. In FIG. 3, curve (1) shows the change in speed of a vehicle as observed when the vehicle runs along descending slopes having gradients of −5% and −0.8% with the throttle valve almost fully closed. It will be understood that the vehicle speed changes in a vibratory manner due to repetitious stopping and starting of fuel injection.

In order to obviate this drawback, Japanese Patent Laid-Open Publication No. 135334 discloses a system in which, when the vehicle is running along a descending slope under the control of an automatic driving apparatus, the duty ratio of electric power supplied to the throttle valve actuator for actuating the throttle valve is controlled such that the periods of the fuel supply cut-off and fuel supply cycles are prolonged so as to reduce the frequency of these cycles, thereby eliminating any unpleasant shock which may otherwise be imparted to the driver.

This system effectively decreases the frequency of vibratory change in the engine output torque by virtue of the prolonged period of fuel supply cut-off and fuel supply cycles but is still unsatisfactory in that the shock itself cannot be completely eliminated because the cut-off of the fuel supply in effect causes a drastic change in the engine output.

Another problem is that the periods of the fuel supply cut-off cycle and fuel supply cycle, prolonged as a result of the duty-ratio control mentioned above, undesirably allow the vehicle to run at a speed which is offset to the higher side or lower side of the set vehicle speed. Consequently, the offset of the vehicle speed is increased to make the speed control unstable.

Such problems would be overcome if the fuel injection controller were so designed as to prohibit the cut-off of fuel supply whenever the vehicle is running on a descending slope while being controlled by the automatic driving apparatus. In such a case, however, the retarding effect known as "engine brake" becomes ineffective due to the fuel being supplied even when the throttle valve opening is minimized. As a result, the vehicle speed is increased as shown by curve (2) in FIG. 3. In addition, the supply of fuel under the condition where the engine torque is not demanded will cause "after burn" of the fuel which produces unfavorable effects such as over-heating of an exhaust gas cleaning catalyst and an increase in the rate of fuel consumption.

Through an intensive study on the problems described hereinbefore, the present inventors have found that the heavy shock produced when the fuel supply is cut-off and when the fuel supply is recovered is attributable to the presence of air flowing through an auxiliary intake passage, as will be understood from the following description.

The suspension of fuel supply essentially requires that the throttle valve be fully closed. Thus, the intake air flow rate is progressively decreased before the fuel is actually cut-off, and, when the cut-off of fuel supply is actually executed, the intake air flow rate has been reduced to a minimum level substantially the same as the flow rate q of air in the auxiliary intake passage. As explained before, the fuel injection controller is adapted to control the fuel injection rate in proportion to the intake air flow rate. This means that the fuel injection rate has been reduced to a level proportional to the intake air flow rate q at the moment immediately before the cut-off of fuel. The fuel injection rate is then drastically reduced to zero due to the fuel supply being actually cut-off. The fuel supply rate is thus changed nonlinearly in an amount proportional to the flow rate q of the air flowing in the auxiliary intake passage. As a result, an abrupt change in the engine output torque causes a shock to a passenger in the vehicle.

When a condition for recovering the supply of fuel is fulfilled, the injection of fuel is again commenced and the rate of fuel supply is drastically increased from zero to a value proportional to the flow rate q of air flowing in the auxiliary intake passage. Consequently, the engine output torque is abruptly increased and a shock to the passengers results.

SUMMARY OF THE INVENTION

Accordingly, an object of the present invention is to provide an automatic driving apparatus which, when a vehicle is running on a descending slope, does not prohibit the cut-off of fuel supply but is capable of suppressing the generation of shock attributable to cut-off and recovery of fuel supply while minimizing variations in the vehicle speed.

According to the present invention, there is provided, as shown in FIG. 1, an automatic driving apparatus for controlling the running speed of a vehicle at a constant set speed, the vehicle being of the type having an internal combustion engine which is provided with a main intake passage B having a throttle valve A therein, an auxiliary intake passage C providing direct communication between portions of the main intake passage upstream and downstream from the throttle valve so as to bypass the throttle valve, an auxiliary intake air valve D adapted for controlling the flow rate of air in the auxiliary intake passage, and a fuel supply cut-off means E for suspending the supply of fuel to the engine from a moment at which a fuel supply cut-off condition, which requires the throttle valve to be set at the minimum opening position and the engine speed to be higher than a predetermined fuel supply cut-off speed, is met until the moment at which a predetermined fuel supply recovery condition is met. The automatic driving apparatus comprises: an actuator F for controlling the opening degree of the throttle valve A; a vehicle speed sensor G for sensing the instant running speed of the vehicle; actuator control means H for controlling the actuator such that the sensed vehicle speed coincides with a predetermined set vehicle speed so as to enable the vehicle to run at the set vehicle speed; and an auxiliary intake air valve control means I for controlling the auxiliary intake air valve D in such a manner that the flow rate of air in the auxiliary intake passage C is reduced before the fuel supply cut-off condition is met during running of the vehicle under contol of the automatic driving apparatus.

In the vehicle speed controller of the invention, the actuator control means H enables the actuator to control the opening of the throttle valve A in such a manner that the vehicle speed detected by the vehicle speed sensor G coincides with the set vehicle speed, whereby the vehicle runs at the constant set speed. When the vehicle is running under the control of the automatic driving apparatus, the fuel supply cut-off means E operates to suspend the fuel supply from a moment at which the engine speed exceeds the fuel supply cut-off engine speed, while the opening of the throttle valve A is minimized, until a moment at which a condition for recovery of the fuel supply is met. Before the fuel supply is actually cut-off, the auxiliary intake air valve D is controlled so as to reduce the flow rate of the air through the auxiliary intake passage C which connects the portions of the main intake passage B upstream and downstream of the throttle valve. The flow rate of the intake air in the auxiliary intake passage C is thus reduced so that the rate of fuel supply is also reduced correspondingly before the fuel supply is actually cut-off. Though the fuel supply rate is reduced to zero when the fuel supply is actually cut-off, the amount of change in the fuel supply rate is small because it has been reduced proportionally with the reduced air flow rate. As a result, the degree of change in the engine output is reduced so that the shock is correspondingly suppressed. When the condition for recovering the fuel supply is satisfied during suspension of the fuel supply, the supply of fuel is commenced to energize the engine. The initial rate of supply of fuel to the engine is small because it is proportional to the flow rate of intake air in the auxiliary intake air passage which has been reduced to a minimum level before the fuel supply is cut off. Consequently, only a small change is caused in the output torque of the engine and the shock imparted to the driver is correspondingly reduced. It is thus possible to suppress shocks which are imparted to the driver of a vehicle as a result of changes in the engine output torque, attributable to cut-off and recovery of fuel supply during running of the vehicle, under the control of this type of automatic driving apparatus.

According to the invention, when the fuel supply is to be cut off during motion of the vehicle under the control of the automatic driving apparatus, the flow rate of the air in the auxiliary intake passage is reduced before the cut-off of the fuel supply is actually executed. Shocks caused by changes in the engine output torque due to the cut-off and recovery of the fuel supply are thus reduced. Additionally, the duty-ratio control conventionally used for the purpose of prolonging the control period of the throttle valve becomes unnecessary so that the offset of the vehicle speed from the set speed can be minimized.

In a first embodiment of the invention, under control of the automatic driving apparatus, the auxiliary intake air valve is operated by the auxiliary intake air valve control means such that the auxiliary intake passage is completely closed before the fuel supply cut-off condition is fulfilled during motion of the vehicle. Thus, there is no flow of air in the auxiliary intake passage. Consequently, the intake air flow rate is minimized at the moment immediately before the fuel supply is cut-off, so that the fuel injection rate is also minimized at the same time. This also minimizes the amount of change in the engine output torque and, hence, the shock at the moment of fuel supply cut-off as well as at the moment of fuel supply recovery.

In a second embodiment of the present invention, the auxiliary intake air valve is operated by the auxiliary intake air valve control means such that the air flow rate in the auxiliary intake passage is progressively decreased before the fuel supply cut-off condition is fulfilled. This progressive decrease in the intake air flow rate causes a corresponding progressive reduction in the fuel injection rate so that a drastic change in the engine output torque, which may otherwise be caused by an abrupt change in the fuel injection rate, is avoided.

In a third embodiment of the invention, the auxiliary intake air valve control means controls the auxiliary intake air valve in such a manner as to decrease the air flow rate in the auxiliary intake passage when the engine speed is higher than a predetermined engine speed determined by the fuel supply cut-off engine speed. The predetermined engine speed may be set at a level which is below the fuel supply cut-off engine speed. In this embodiment of the invention, the flow rate of air in the auxiliary intake passage is reduced in the range of operation when one of two fuel supply cut-off conditions is met, i.e., when the engine speed is higher than the predetermined engine speed, the levels of shock produced when the fuel is cut-off and when the fuel supply is recovered are reduced. In general, the fuel supply rate controller is provided with a detector for detecting the engine speed. The engine speed detector can further provide information as to whether or not the fuel supply cut-off condition has been met. It is therefore possible to suppress the shock produced when the fuel supply is cut-off and recovered without necessitating a specific sensor.

In a fourth embodiment of the invention, the automatic driving apparatus is provided with a detecting means capable of detecting whether or not the instant degree of opening of the throttle valve is near a minimum degree of opening. When the detecting means detects that the throttle valve opening has been reduced to a degree approximating the minimum degree, the auxiliary intake air valve control means operates to control the auxiliary intake air valve so as to reduce the flow rate of air in the auxiliary intake air valve. As described before, in the third embodiment of the invention, the auxiliary intake air valve is controlled when one of two requirements of the fuel supply cut-off condition is met or is going to be met. In the fourth embodiment of the invention, a judgment is conducted as to whether there is a possibility for the other requirement to be met through detecting whether the throttle valve opening is near the minimum opening. In accordance with the result of this judgment, the auxiliary intake air valve is controlled. The invention can thus reduce shocks attributable to cut-off and recovery of the fuel supply in the same manner as in the third embodiment of the invention. The detecting means may be constituted by a throttle sensor, capable of sensing the degree of opening of the throttle valve, and a comparator which compares the output of the throttle sensor to a value corresponding to a degree of opening near the minimum degree of opening.

In a fifth embodiment of the present invention, the auxiliary intake air valve control means controls the auxiliary intake air valve in such a manner that the flow rate of air in the auxiliary intake passage is decreased before the fuel supply cut-off condition is established. The auxiliary intake air valve control apparatus also controls the auxiliary intake air valve such that the flow rate of air in the auxiliary intake passage is increased after the fuel supply recovery condition is met. Whether or not the fuel supply cut-off condition has not been established can be judged by examining whether the engine speed is higher than a predetermined engine speed which is determined in relation to the fuel supply cut-off engine speed. This predetermined engine speed may be below the fuel supply cut-off engine speed. Similarly, whether or not the fuel supply recovery condition has been met can be judged by examining whether the engine speed is lower than a predetermined engine speed which is determined in relation to the fuel supply recovery speed. This predetermined engine speed may be below the fuel supply recovery speed. According to this embodiment of the invention, the flow rate of air in the auxiliary intake passage has been reduced before the fuel supply cut-off condition is met, so that shocks produced when the fuel supply is cut-off and recovered are thus reduced. Additionally, since the air flow rate in the auxiliary intake passage is increased after the fuel supply recovery condition is met, it is possible to prevent stalling of the engine which may otherwise be caused by insufficient supply of intake air when the engine speed is low.

The first and the second embodiments described above can be applied to the third, fourth and fifth embodiments also described above.

Other features and advantages of the present invention will become evident from the following description of the preferred embodiments when read in conjunction with the accompanying drawings.

BRIEF DESCRIPTION OF THE DRAWINGS

FIG. 5 is a graph illustrating the relationship between the accelerator cable tension and degree of throttle opening;

DESCRIPTION OF THE PREFERRED EMBODIMENT

Figure 1:
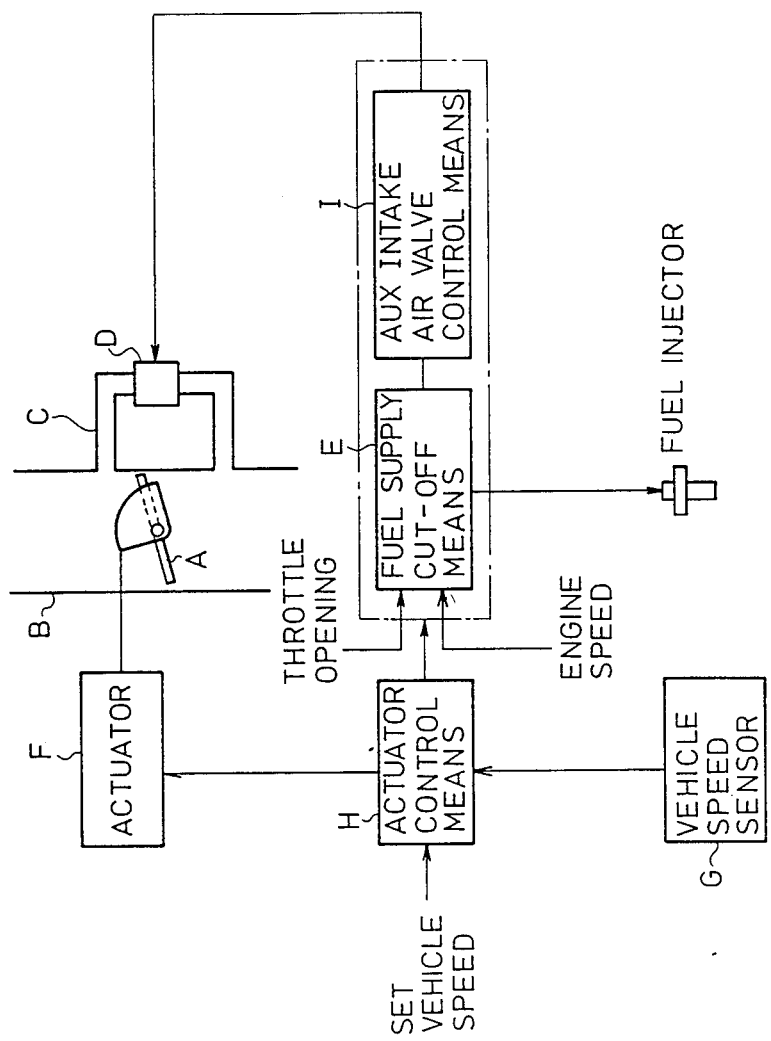
FIG. 1 is a block diagram of the vehicle speed control apparatus and fuel injection control system of the invention.
Figure 4:
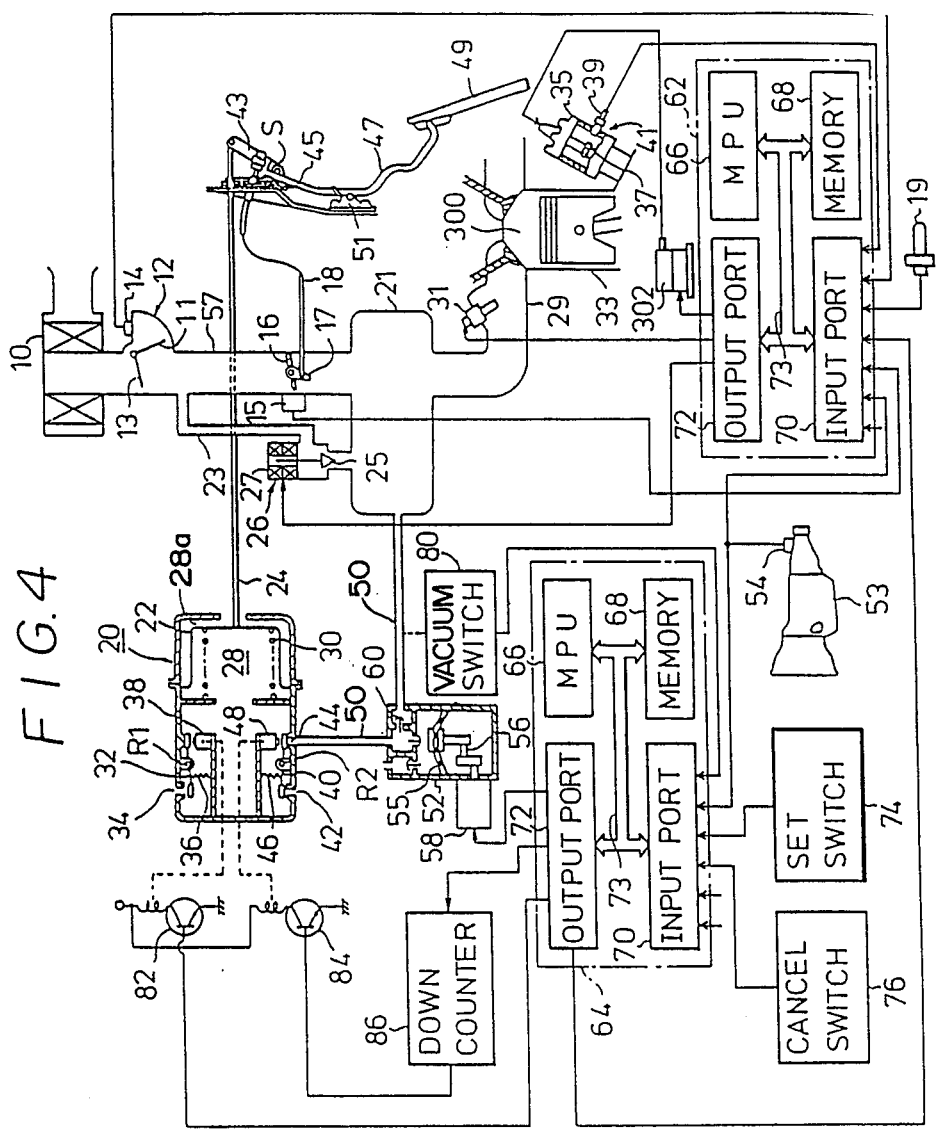
FIG. 4 is a block diagram of one embodiment of the automatic driving apparatus of the present invention.

A preferred embodiment of the present invention will be described hereforth with reference to the accompanying drawings. FIG. 1 is a block diagram of an automatic speed control apparatus for an internal combustion engine which embodies the present invention. Referring to FIG. 4, an intake air flow-rate sensor 12 is disposed on the downstream side of an air cleaner as viewed in the direction of air flow. The intake air flow-rate sensor 12 comprises a measuring plate 13 adapted to be rotationally moved by air flow in a main intake passage 57, a compensation plate 11 connected to the measuring plate 13 and swingable within a damping chamber, and a potentiometer 14 which produces a voltage corresponding to the degree of opening of the measuring plate 13. A throttle valve 16 is rotatably carried by a shaft and disposed in a portion of the main intake passage 57 downstream from the intake air flow-rate sensor 12. The ends of a lever 17 are connected to the shaft of throttle valve 16 and to an accelerator control cable 18, respectively. The other end of the control cable 18 is connected to an arm 47 which is connected to an accelerator pedal 49. Arm 47 is rotatable about a bracket 51. An idle switch 15 associated with the throttle valve is adapted to be turned on when the opening of the throttle valve is minimum, i.e., when the throttle valve is fully closed.

A surge tank 21 disposed downstream from the throttle valve 16 communicates with combustion chambers 300 of the engine 33 through an intake manifold 29. An auxiliary intake passage 23 provides a direct communication between portions of the main intake passage 57 upstream and downstream of the throttle valve 16 so as to bypass the throttle valve. An idle speed control (ISC) valve 26 serving as an auxiliary intake air valve is disposed at an intermediate portion of the auxiliary intake passage 23. The ISC valve 26 includes a pulse motor 27 having a stator provided with four poles, and a valve member 25 which is adapted to vary the cross-sectional area of the auxiliary intake passage 23. The intake manifold 29 has fuel injectors 31 corresponding to the cylinders of the engine. The combustion chambers in the cylinders of the engine communicate, through an exhaust manifold, with a catalyst device (not shown) charged with a ternary catalyst. The engine 33 also has spark plugs (not shown) projecting into the respective combustion chambers. These spark plugs are connected to a fuel injection control circuit 62 through a distributor 35 and an igniter 302. The distributor 35 includes a distributor housing, distributor shaft, a signal rotor 37 connected to the distributor shaft, and a pick-up fixed to the distributor housing. The signal rotor 37 and the pickup 39 in cooperation constitute a rotation angle sensor 41. It is possible to compute the engine speed from the period of the signal produced by this rotation angle sensor. A water temperature sensor 19 is mounted in such a manner as to project into a water jacket of the engine 33 for the purpose of sensing the temperature of the cooling water circulated through the water jacket. A reference numeral 54 denotes a vehicle speed sensor which is capable of detecting the vehicle speed from the rotation speed of the output shaft of an automatic transmission 53.

The fuel injection control circuit 62 comprises a microcomputer which has a microprocessing unit (MPU) 66, a memory 68 including a read only memory (ROM), a random access memory (RAM), an input port 70, an output port 72 and a BUS which interconnects these constituents. The output port 72 is connected to the fuel injectors 31 and the pulse motor 27 for controlling the ISC valve 26. Connected to the input port 70 are pickup 39 of the rotation angle sensor 41, a potentiometer 14 of the intake air flow-rate sensor 12, a water temperature sensor 19, an idle switch 15 and a vehicle speed sensor 54.

An actuator is provided which actuates the throttle valve so as to change the degree of opening of the throttle valve 16. An actuator control circuit is also provided for controlling the actuator. An automatic driving constantspeed actuator (referred to as A/D actuator hereinunder) 20 has a diaphragm 22 which divides the space in the actuator 20 into an atmospheric chamber 28a communicating with the atmosphere and a vacuum chamber 28. The diaphragm 22 is connected through an A/D control cable 24 to one end of a lever 43 which is rotatable about a fulcrum S. A pin 45 is provided on the other end of the lever 43 such as to project therefrom. The arrangement is such that, as the lever 43 rotates counterclockwise about the fulcrum S, the pin 45 presses one end of the arm 47 so as to cause the arm 47 to rotate clockwise about the bracket 51 and thereby vary the degree of opening of the throttle lever 16 through the accelerator control cable 18 and the lever 17.

The opening of the throttle valve 16 is controlled in accordance with the displacement of the diaphragm 22. The relationship between the tension acting in the A/D control cable 24 and the degree of opening of the throttle valve is shown in FIG. 5. It will be understood that the degree of opening of the throttle valve 16 has a certain hysteresis with respect to the tension. A compression spring 30 disposed in the vacuum chamber 28 defined by the diaphragm 22 serves to normally bias the diaphragm 22 towards the atmospheric chamber. The A/D actuator 20 is provided with a relief port 34 which communicates the interior of the A/D actuator with the atmosphere. The relief port 34 is adapted to be opened and closed by a relief valve 32 mounted in the actuator 20 so as to be pivoted about a fulcrum R1. The relief valve 32 is normally urged in such a direction as to open the relief port 34 by the force of a tensile spring 36. The actuator 20 also has a solenoid 38, mounted therein, adapted for electromagnetically attracting the relief valve 32. When the solenoid 38 is not energized, the tensile spring 36 urges the relief valve 32 in such a direction as to open the relief port 34. In this way atmospheric air is introduced into the actuator 20 through the relief port 34. On the other hand, when the solenoid 38 is energized, one end of the relief valve 32 is attracted by the solenoid 38 against the force of the tensile spring 36 so that the other end of the relief valve 32 closes the relief port 34. Consequently, the introduction of the atmospheric air through the relief port 34 is ceased.

The actuator 20 is further provided with a vacuum port 44 which communciates with the surge tank 21 through a vacuum passage 50 and an atmospheric port 42 positioned in the vicinity of the vacuum port 44 as shown in FIG. 4. The atmospheric port 42 and the vacuum port 44 are adapted to be opened and closed by a control valve 40 which rocks about a fulcrum R2. The control valve 40 is normally biased by a tensile spring in such a direction that it opens the atmospheric port 42 while closing the vacuum port 44. The control valve 40 is adapted to be selectively attracted by a solenoid is which also disposed in the actuator 20. When the solenoid 48 is not energized, the control valve 40 is urged by the tensile spring 46 so as to open the atmospheric port 42 while closing the vacuum port 44. As the solenoid 48 is energized, the control valve 40 is attracted by the solenoid 48 against the biasing force of the tensile spring 46 so that the control valve 40 is rotated about the fulcrum R2. Thus, one end of the control valve 40 closes the atmospheric port 42 while the other end of the control valve 40 opens the vacuum port 44. When the vacuum port 44 is opened as described, vacuum is introduced into a vacuum chamber 28 from the surge tank 21 via the vacuum passage 50, so that the diaphragm 22 is deflected against the force of the compression spring 30 to cause a displacement in such a direction as to increase the degree of opening of the throttle valve 16.

A vacuum pump 52 having a check valve 60 is disposed in an intermediate portion of the vacuum passage 50. The vacuum pump 52 is provided therein with a diaphragm 55 which is adapted to be deflected so as to produce vacuum. The diaphragm 55 is connected to a motor 58 through a crank 56. When the level of the vacuum in the vacuum passage is low, the motor 58 operates to displace the diaphragm 58 through the crank 56 so as to generate vacuum introduced into the vacuum chamber 28. A vacuum switch 80 is provided for the purpose of detecting whether the level of the vacuum in the vacuum passage is sufficiently high or not.

Solenoid 38 and Solenoid 48 are controlled by an automatic drive (A/D) control circuit 64 which is composed of a microcomputer. The A/D control circuit 64 is constructed in the same manner as the fuel injection control circuit explained before. The blocks in the A/D control circuit 64 therefore are denoted by the same reference numerals as the blocks in the fuel injection control circuit 62 and detailed description thereof is omitted. To the input port 70 of the A/D control circuit 64 are connected a vacuum switch 80, the vehicle speed sensor 54, a set switch 74 which is adapted to be manipulated by the driver for the purpose of setting the vehicle speed in the automatic speed control mode, and a cancel switch 76 which includes a switch operated by the driver to turn off the automatic speed control and a switch which automatically turns off the control when pressure is applied to the brake pedal. The output port 72 of the A/D control circuit 64 is connected to the motor 58. The output port 72 is also connected through a down counter 86 to a transistor 84 which is adapted for turning on and off the solenoid 48. Output port 72 is further connected to a transistor 82 which is adapted for turning on and off the solenoid 38. The read only memory in the memory 68 stores a program of control routines which will be explained hereinunder. This routine adopts the first, second and fifth embodiments of the invention previously described.

The operation of this embodiment will be explained with reference to the drawings.

Figure 6A:
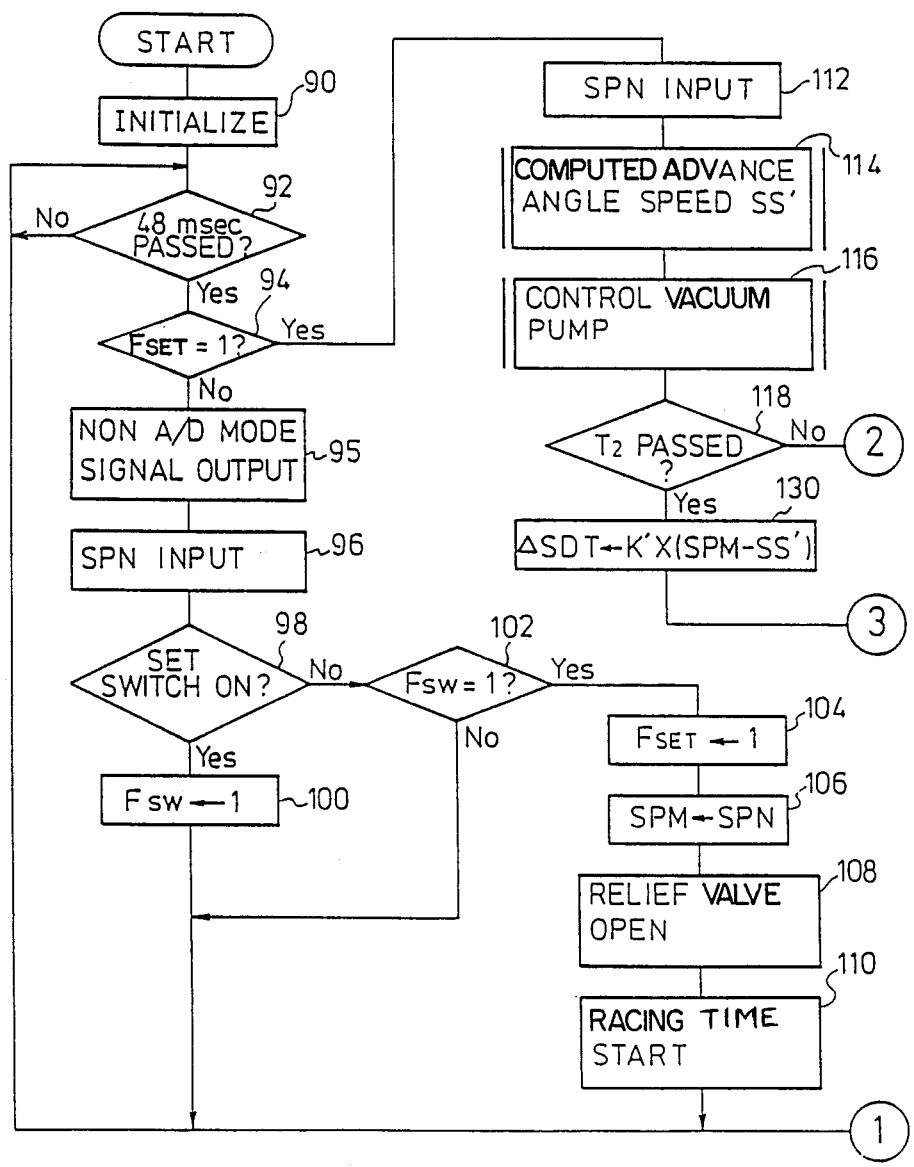
FIGS. 6(A) and 6(B) illustrate a flow chart of a process in one embodiment of the present invention for maintaining the speed of a vehicle at a constant running speed.
Figure 6B:
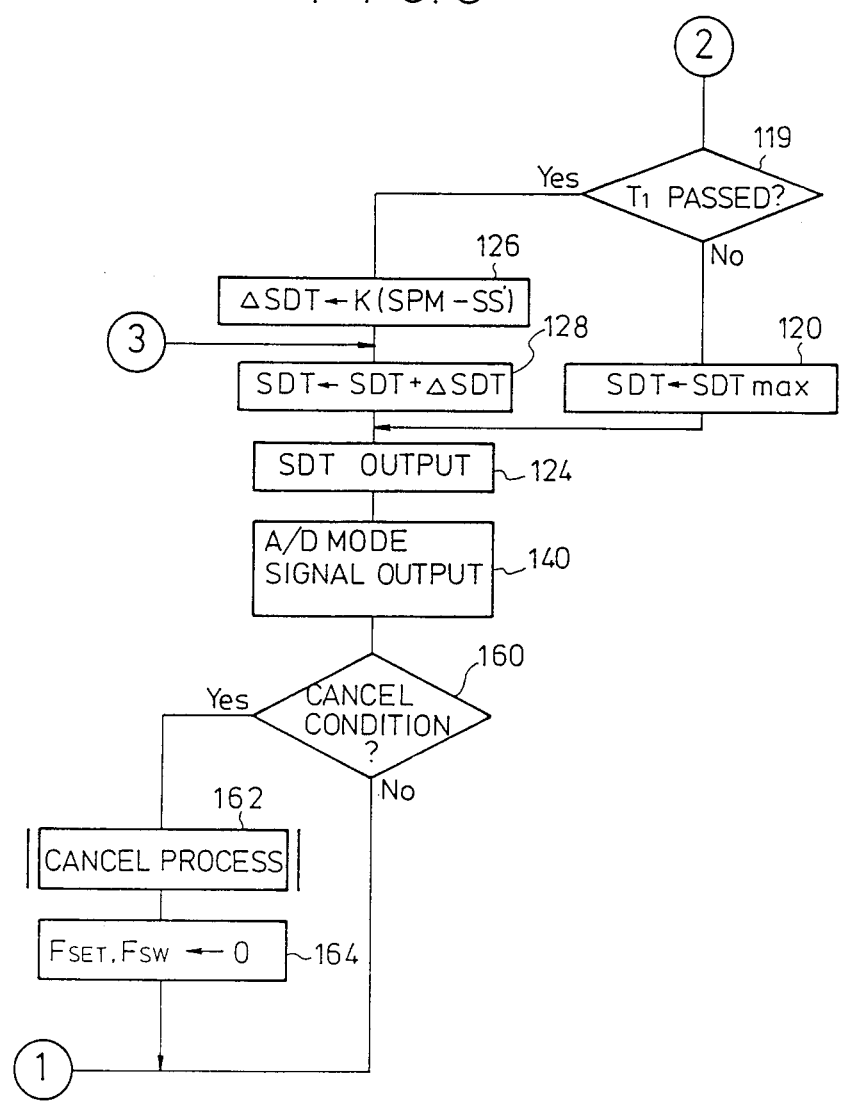

The control routine of the A/D control circuit 64 will be described first with specific reference to FIGS. 6(A) and 6(B). The control routine shown in FIGS. 6(A) and 6(B) is started as the ignition switch is turned on. In Step 90, initialization is executed so that initial values are set in the registers of the MPU 66, RAM region of the memory 68, input port 70 and the output port 72. In Step 92, a judgment is conducted as to whether or not a predetermined time, e.g., 48 msec, has passed. If the answer is YES, the process proceeds to Step 94. That is, the routine including Step 94 onwards is executed periodically at a predetermined time interval. In Step 94, whether or not a flag $F_{SET}=1$ has been set is examined. This flag $F_{SET}=1$ is set up when the vehicle is running in the automatic (A/D) speed control mode but is reset or set down when the vehicle is running in the normal mode. When the vehicle is running in the normal running mode, i.e., when the flag $F_{SET}$ has been in the reset state, the process proceeds to Step 95 in which a non-A/D mode signal is output from the output port 72 of the A/D control circuit 64 to the input port 70 of the fuel injection control circuit 62. In the next step, i.e., Step 96, the instant vehicle running speed SPN is sensed by the vehicle speed sensor 54 and in Step 98, a judgment is conducted as to whether or not the switch is to be set. When the answer to the question posed in Step 98 proves that the set switch has been turned on, the process proceeds to Step 100 in which the flag $F_{SW}$ is set. Conversely, when the set switch has not been turned on, a judgment is conducted in Step 102 as to whether or not the flag $F_{SW}$ has been set. If the set switch has been maintained in an off state, the flag $F_{SW}$ is in a reset state which is confirmed in Step 102. In this case, the process returns to Step 92. Conversely, if the set switch has been turned off after being turned on, the flag $F_{SW}$ has been set so that the set state of this flag is confirmed in Step 102. This means that the driver has manipulated the set switch for the purpose of selecting the automatic speed control mode so that the condition for the automatic speed control mode has been satisfied. In this case, the process proceeds to Step 104 in which the flag $F_{SET}$ is set and, in Step 106, the instant vehicle speed SPN is stored as a set vehicle speed SPM in a predetermined area of the random access memory. In Step 108, an ON signal is supplied to the transistor 82 so as to energize the solenoid 38, whereby the relief valve 32 is operated to close the relief port 34. This makes it possible to introduce vacuum into the vacuum chamber 28. The next step 110 activates a racing timer which is a soft timer for measuring predetermined short time periods T1 and T2 after the automatic speed control mode is started. During period T1, the actuator 20 is driven with the maximum duty ratio and, in the subsequent period T2, the feedback gain is enhanced so as to promote the displacement of the diaphragm 22 in the actuator 20, thereby hastening the movement of the diaphragm 22 to a position for equalizing the vehicle speed to the set vehicle speed. Time periods T1 and T2 are determined in accordance with the set vehicle speed. For instance, the period T1 is set to be 0.5 to 1 second, while the period T2 is set to be, for example, 7 to 10 seconds.

When the answer to the question posed in Step 94 has proved that the flag $F_{SET}$ has been set, i.e., when the automatic speed control mode is to be executed, the process proceeds to Step 112 in which the instant vehicle speed SPN sensed by the vehicle speed sensor is picked up and, thereafter, the process proceeds to Step 114 so as to compute the advance angle speed SS'. The advance angle speed SS' is a predicted speed at which the vehicle is expected to run at a moment after elapse of a predetermined short time period, e.g., 2 seconds, from the instant moment.

Thus, the advance angle speed SS' can be determined by, for example, differentiating the instant vehicle speed SPN. By using this advance angle speed SS', it is possible to effect a stable control of the vehicle speed in the automatic speed control mode regardless of any time lag which may be involved in the automatic speed control system. The next step 116 is for conducting processing concerning the driving of a vacuum pump 52. More specifically, in this step, a judgment is conducted as to whether the vacuum switch 80 has been turned on, i.e., whether the level of the vacuum is high enough to generate a force for displacing the diaphragm 22. When the level of the vacuum is too low to generate such a force, the motor 58 is started to produce vacuum of a level high enough to produce a force necessary for the operation of the actuator 20. In the next step 118, a judgment is conducted as to whether the time period T2 has elapsed, on the basis of the value counted by the racing timer started in Step 110 previously mentioned. If it is judged that the time T2 has not elapsed, a judgment is conducted in Step 119 (FIG. 6(B)), on the basis of the value counted by the racing timer, as to whether or not the period T1 has elapsed. An answer NO to the question posed in Step 119 means that the period T1 has not yet elapsed after the operation of the set switch. In such a case, the duty ratio SDT of the control signal for controlling the control valve 40 is set at the maximum value SDTmax in Step 120. The maximum value SDTmax of the duty ratio is determined such that it can produce a displacement of the diaphragm 22 which is necessary for the vehicle speed to approximate the set vehicle speed.

Figure 9:
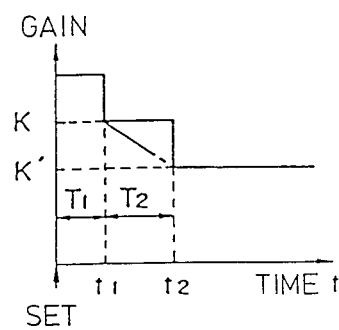
FIG. 9 is a diagram showing a change in the gain associated with a feedback control during operation of the vehicle in the automatic speed control mode.

If the period T1 has elapsed, an answer YES is obtained in Step 119 so that the process proceeds to Step 126 in which a duty ratio correction value $\Delta SDT$ is computed in accordance with the following formula (1).

$$\Delta SDT = K \cdot (SPM - SS') \quad (1)$$

where, K represents the gain of the feedback control. The value of the gain K is determined to be greater than a gain K' which will be explained later in connection with step 130 with reference to FIG. 9. In Step 128, the duty ratio correction value $\Delta SDT$ is added to the duty ratio SDT of the control signal which controls the operation of the control valve 40, whereby a corrected duty ratio SDT is produced.

An answer YES to the question posed in Step 118 means that the period T2 has elapsed. In such a case, the process proceeds to Step 130 in which a duty ratio correction valve $\Delta SDT$ is computed in accordance with the following formula (2):

$$\Delta SDT = K' \cdot (SPM - SS') \quad (2)$$

where, K' represents the gain of the feedback control which is determined to be a value smaller than the gain K appearing in the formula (1). More specifically, the value of the gain K' is so determined as to provide a stable controllability of the diaphragm 22 so as to avoid any hunting (The movement of the diaphragm 22 is made unstable so that the diaphragm 22 is put in a continuous vibration situation.) of movement of the diaphragm 22 when it has been deflected to a position near the command position. Using this duty ratio correction value $\Delta SDT$, the duty ratio SDT is corrected in Step 128 in the same manner as that described above.

In the next step 124, a time corresponding to the duty ratio SDT is set in the down counter 86. The down counter 86 executes down counting for a period which is determined by the duty ratio SDT, and delivers an ON signal to the transistor 84 throughout the period in which the down counting is executed. As explained before, the routine shown in FIGS. 6(A) and 6(B) is executed cyclically at a predetermined time interval or period which is, for example, 48 msec. The ON time of the control signal is therefore determined from this predetermined period and the duty ratio SDT, and this time is set in the down counter 86. For instance, representing the predetermined period of execution of the routine by T and the duty ratio by X%, the time set in the counter is expressed by T × X/100.

Figure 7:
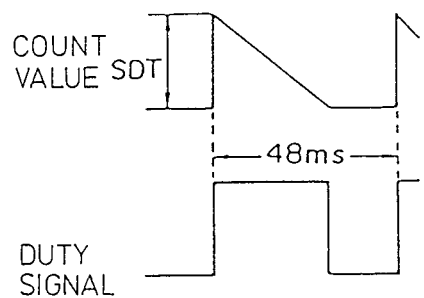
FIG. 7 is a diagram showing the relationship between the count value and the duty ratio of a control signal according to the present invention.

FIG. 7 shows the relationship between the value counted by the down counter and the control signal. It will be seen that the On signal is maintained until the down counter reaches zero. Then, an OFF signal is output for a period of 48 msec thereafter. As a result, the transistor 84 is controlled by a duty ratio which corresponds to the time set in the down counter 86, so that the control valve 40 is controlled to open and close in accordance with the duty ratio whereby vacuum is introduced into the vacuum chamber so as to cause the diaphragm 22 to deflect over a stroke length corresponding to the duty ratio. In the next step 140, a signal indicating that the vehicle is running in the automatic speed control mode is output from the output port 72 of the A/D control circuit 64 to the input port 70 of the fuel injection control circuit 62.

A description will now be made as to the change in stroke of the diaphragm 22 of the actuator 20 caused by the described duty ratio control.

Figure 8:
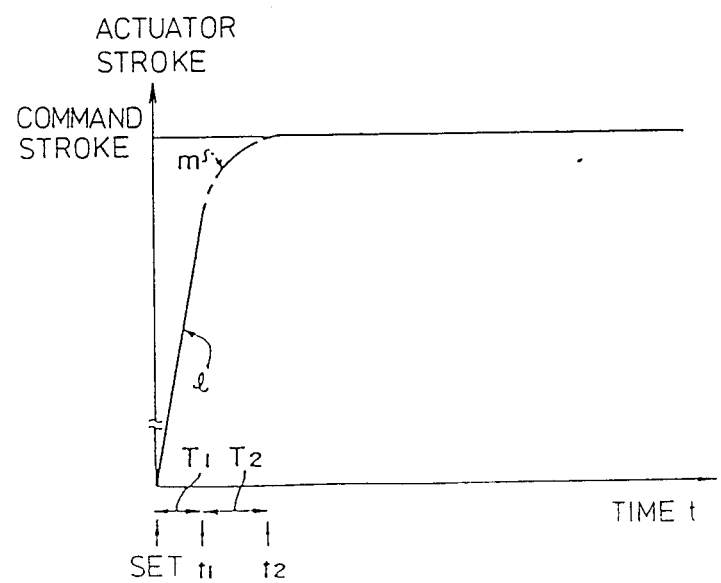
FIG. 8 is a graph illustrating the amount of change in the stroke of an actuator in relation to the elapsed time after the vehicle speed control mode is changed from a normal speed control mode to an automatic speed control mode.

In the period T1 after the operation of the set switch, the duty ratio SDT is set at the maximum value SDTmax as explained before, so that the stroke of the diaphragm 22 is increased rapidly towards the command stroke value corresponding to the set vehicle speed, as represented by a straight line l in FIG. 8. In the subsequent period T2, the feedback control is executed with a large gain K so that the stroke of the diaphragm 22 is rapidly controlled so as to progressively approach the command stroke, as represented by a curve m in FIG. 8. After the period (T1+T2) has elapsed, the stroke of the diaphragm 22 is controlled so as to be maintained at the command stroke.

In the next step 160, a judgment is conducted as to whether or not the cancel switch 76 has been turned on, thereby determining whether or not the canceling condition has been met. When it is judged that the canceling condition has been met, the process proceeds to Step 162 in which relief valve 32 and the control valve 40 are operated to open the atmospheric ports whereby the canceling process is executed. Flags $F_{SET}$ and $F_{SW}$ are reset in Step 164.

Figure 10:
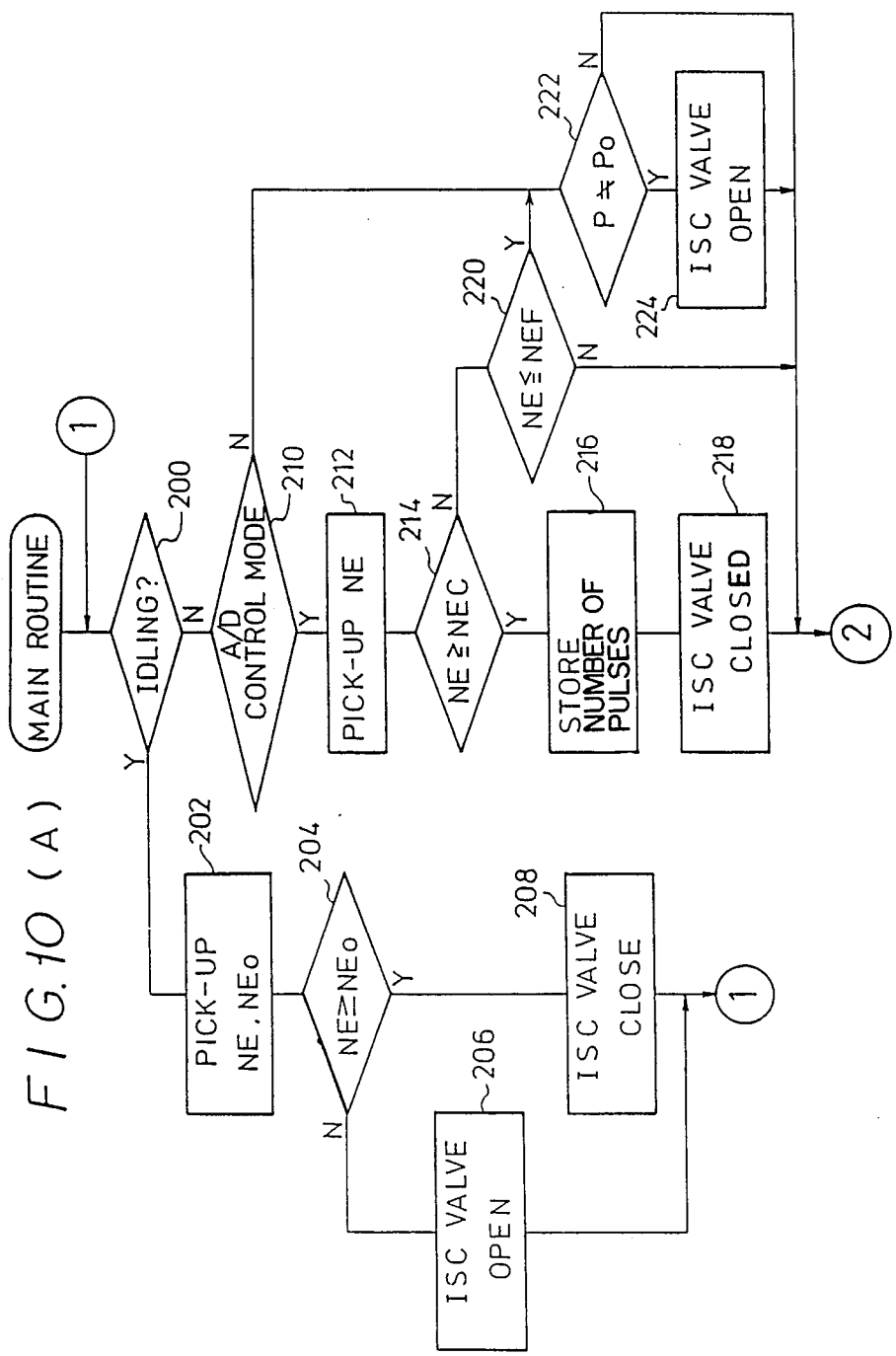
FIGS. 10(A) and 10(B) illustrate a flow chart illustrating a process for controlling the idle speed control valve and the fuel injection rate in one embodiment of the present invention.
Figure 10:
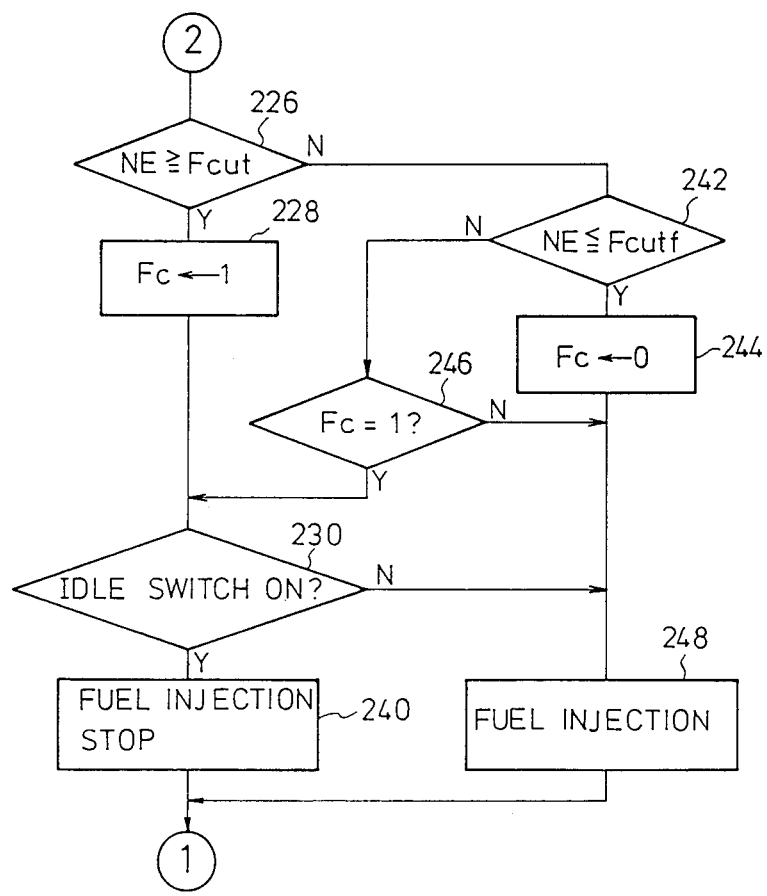

FIGS. 10(A) and 10(B) show a portion of the main routine which is executed by the fuel injection control circuit 62. In Step 200, a judgment is conducted as to whether or not the engine is idling. This can be conducted by confirming both the ON state of the idle switch and the vehicle speed being below a predetermined slow speed, e.g., 2.5 Km/h. When the engine is idling, an answer YES is obtained so that the process proceeds to Step 202 in which the instant engine speed NE and command engine speed $NE_0$ are computed. This command engine speed $NE_0$ is determined in accordance with the shift position of the automatic transmission and other factors. In Step 204, the computed instant engine speed NE and the command engine speed $NE_0$ are compared with each other. If the condition of $NE \geq NE_0$ is met, the pulse motor 27 is controlled so as to close the ISC valve, whereas, if the condition is $NE < NE_0$, the process proceeds to Step 206 in which a control is executed so as to open the ISC valve 26.

The above-described control of the ISC valve 26 causes the flow rate of air in the auxiliary intake passage to be controlled in such a manner that the engine speed NE follows the command engine speed $NE_0$.

Figure 11:
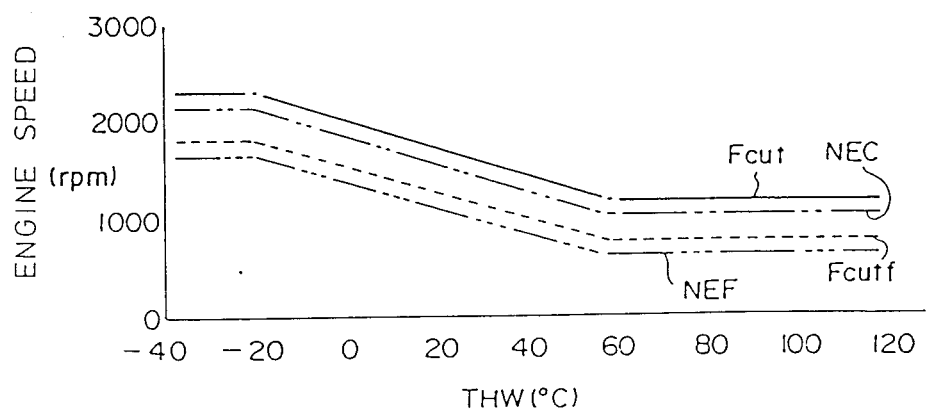
FIG. 11 is a graph illustrating the manner in which fuel supply cut-off engine speed, valve closing engine speed, valve opening engine speed and fuel supply recovery engine speed are related to one another according to the present invention.

An answer NO to the question posed in Step 200 means that the engine is operating but not idling, i.e., that the vehicle is in motion. The process then proceeds to Step 210 in which a judgment is conducted as to whether the vehicle in under the A/D control. This judgment is conducted by examining the signal derived from the A/D control circuit 64. When it is judged that the vehicle is running in the automatic speed control (A/D) mode, the process proceeds to Step 212 in which the instant engine speed NE is computed. The thus computed engine speed NE is compared with a valve closing engine speed NEC in Step 214. The valve closing engine speed NEC is determined in accordance with a fuel supply cut-off engine speed Fcut. The fuel supply cut-off engine speed Fcut is determined in relation to the engine cooling water temperature THW from the data shown in FIG. 11. As shown in FIG. 11, the valve closing engine speed NEC is below the fuel supply cut-off engine speed Fcut at all engine cooling water temperatures. When the condition of $NE \geq NEC$ is confirmed in Step 214, the process proceeds to Step 216 in which the number of pulses $P_0$ indicative of the instant position of the ISC valve 26 is stored in a predetermined area of the random access memory. Then, the ISC valve is progressively closed to the full close position in Step 218. Consequently, the flow rate of air in the auxiliary intake passage 23 is reduced to zero.

When the condition of $NE < NEC$ is met in Step 214, the process proceeds to Step 220 in which the instant engine speed NE is compared with a valve closing engine speed NEF determined in relation to a fuel supply recovery engine speed Fcutf. The fuel supply recovery engine speed is determined in accordance with the engine cooling water temperature THW from the data shown in FIG. 11. As shown in FIG. 11, the valve opening engine speed NEF is below the fuel supply recovery engine speed Fcutf at all engine cooling water temperatures. The fuel supply recovery engine speed Fcutf is lower than the fuel supply cut-off speed by a predetermined value which is, for example, 50 to 100 rpm. When the condition of $NE \leq NEF$ is met in Step 220, the process proceeds to Step 222 in which the pulse number P representing the instant position of the ISC valve is compared with the pulse number $P_0$ stored in the random access memory. In the event that the pulse numbers are not equal, a control is executed in Step 224 so as to progressively open the ISC valve.

If the judgment in Step 210 has proved that the vehicle is not under automatic driving (A/D) control, the process proceeds to Step 222. In the event that the condition of $NE > NEF$ is confirmed in Step 220, the process proceeds to Step 226, as shown in FIG. 10(B). If the pulse numbers P and $P_0$ are judged as being equal in Step 222, the process proceeds to Step 226.

The described control causes the ISC valve to be progressively closed to the full close state when the instant engine speed NE is higher than the valve closing engine speed NEC. On the other hand, when the instant engine speed NE falls below the valve opening engine speed NEF, or when the automatic driving (A/D) control is dismissed, the ISC valve is progressively opened until it resumes the initial position, i.e., the position at which the ISC valve was set before the control was commenced. It will be understood that, when the vehicle is running in the normal running mode, i.e., when the A/D mode has been dismissed, the vehicle can be accelerated in such a manner as to impart an ordinary feeling of acceleration before the ISC valve has been returned to the initial position.

Steps 226 and 248 are routines for executing the fuel supply cut-off and fuel supply recovery, respectively. In Step 226, a comparison is made between the instant engine speed NE and the fuel supply cut-off engine speed Fcut which is computed in accordance with the engine cooling water temperature THW from the graph shown in FIG. 11. If the condition of $NE \geq Fcut$ is confirmed in Step 226, the process proceeds to Step 228 for setting a fuel cut-off flag Fc and then to Step 230 in which a judgment is conducted as to whether or not the throttle valve has been fully closed by examining the state of the idle switch 15. On condition of full-closing of the throttle valve, the process proceeds to Step 240 in which fuel injection from all the fuel injectors is stopped. In the event that the idle switch has not been turned on in Step 230, the process proceeds to Step 248 in which the fuel injectors 31 are opened to execute fuel injection for a period which corresponds to the fuel injection time. In accordance with factors such as the intake air temperature and the engine cooling water temperature, the fuel injection time is determined both by the engine speed and the intake air flow rate.

If the judgment in Step 226 has confirmed that the condition of $NE < Fcut$ is met, the process proceeds to Step 242 in which the instant engine speed NE is compared with the fuel supply recovery engine speed Fcutf which is computed in accordance with the instant engine cooling water temperature THW from the data shown in FIG. 11. If the condition of $NE \leq Fcutf$ is met, the fuel injection is executed in Step 248 in the same manner as above after the fuel cut-off flag Fc is reset in Step 244. Conversely, if the condition of $NE > Fcutf$ is met in Step 242, a judgment is conducted in Step 246 as to whether or not the fuel cut-off flag Fc has been set. If this flag has been set, the process proceeds to Step 230, whereas, if the same flag has been reset, the process proceeds to Step 248.

The above-described control causes the fuel injection to be stopped on condition that the instant engine speed NE is higher than the fuel supply cut-off speed Fcut and that the idle switch has been turned on. The fuel supply is recovered when the throttle valve is operated from the fully closed position during suspension of the fuel supply and when the engine speed has come down below the fuel supply recovery speed while the throttle valve is in the fully closed position.

Figure 2:
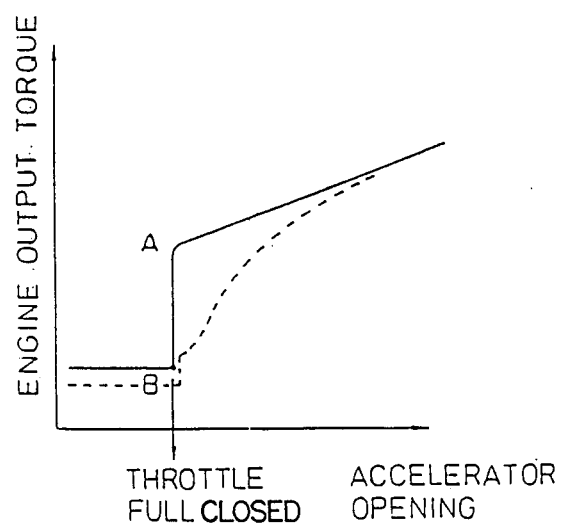
FIG. 2 is a graph which shows the relationship between the degree of throttle valve opening, i.e., accelerator opening, and output torque of an engine according to one embodiment of the present invention.
Figure 3:
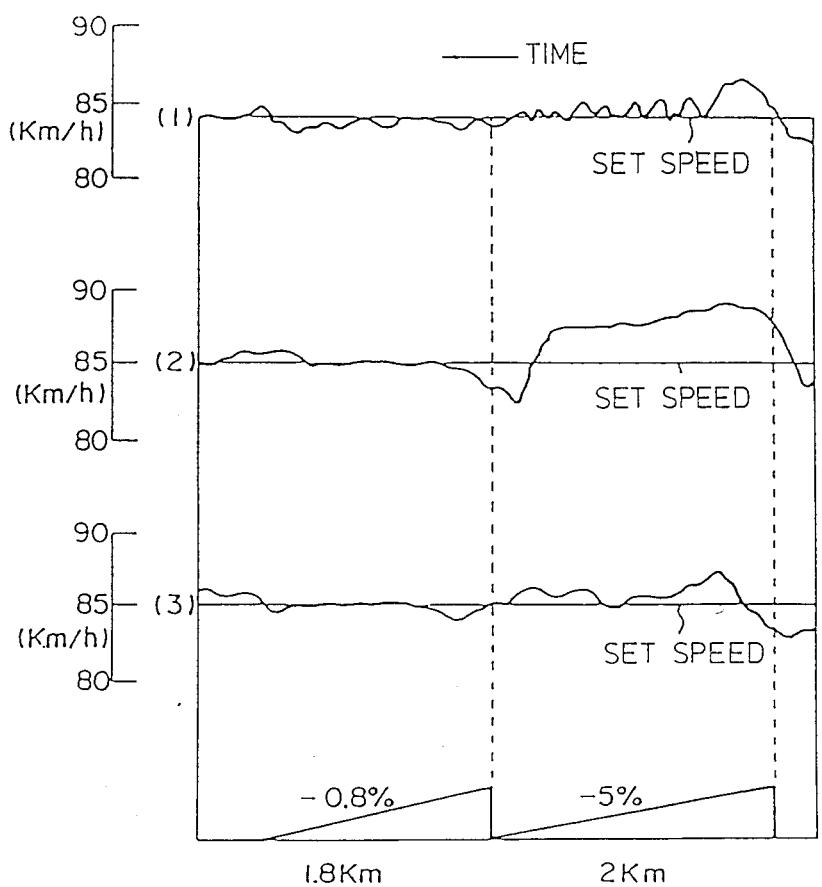
FIG. 3 is a graph which shows the change in speed, in each of three cases, of a vehicle running down a slope under the control of an automatic driving apparatus.

Since the ISC valve has been fully closed before the fuel supply is cut-off, no substantial change in the engine output torque is caused when the fuel supply is cut-off or recovered, whereby the unfavorable shock which heretofore has been experienced when the fuel supply is cut-off or recovered can be avoided, and, therefore, the generation of driving surge can be prevented. Furthermore, since the ISC valve is opened to the initial position after the recovery of the fuel supply, a flow rate of air is maintained in the auxiliary intake passage which is large enough to prevent any tendency for the engine to stall due to insufficient supply of intake air when the engine speed is low. The manner in which the engine output torque is changed in relation to the change in the throttle opening under the above-described control is shown by the broken-line curve in FIG. 2. As will be understood from this Figure, the amount of change in the engine output torque is smaller in the embodiment of the present invention than that in the conventional system which is shown by the solid-line curve. FIG. 3 shows the change in vehicle speed when a vehicle runs on descending slopes with gradients of −5% and −0.8% under the automatic driving control performed by the automatic speed control apparatus of the present invention. It will be seen that the vehicle controlled by the automatic driving apparatus of the invention undergoes a small amount of change in vehicle speed as compared to that experienced by the vehicle controlled by the conventional automatic driving apparatus shown by curve (1) in FIG. 3. The amount of change in the vehicle speed shown by curve (3) is small even when compared to that shown in curve (2) in FIG. 3. Curve 2 shows the speed to time relationship exhibited by a vehicle controlled by a modified known automatic driving apparatus which is designed to prohibit the cut-off of fuel supply.

The preferred embodiment described hereinbefore incorporates the first, second and fifth embodiments of the invention previously described. It is to be understood, however, that the described embodiment is only illustrative and the invention can be carried out in accordance with the third and fourth embodiments previously described. It is also to be noted that, though the described embodiment is applied to an internal combustion engine of the type which injects fuel at a rate determined by the intake air flow rate and the engine speed, the invention can equally be applied to other types of engine such as an engine which employs the intake vacuum and the engine speed as factors for determining the fuel injection rate. The ISC valve, which is driven by a stepper motor in the described embodiment, may be driven by other means such as a solenoid. In such a case, the duty ratio of the electric current supplied to the solenoid is controlled so as to control the degree of opening of the ISC valve and, hence, the flow rate of air in the auxiliary intake passage. Furthermore, the arrangement may be modified such that the automatic driving control cable directly controls the degree of opening of the throttle valve, although in the described embodiment the degree of opening of the throttle valve is controlled through the automatic driving control cable and the accelerator control cable.

Although the invention has been described through its preferred embodiment together with some modifications, it is to be understood that further modifications and variations are possible within the scope of the present invention which is limited solely by the appended claims.

What is claimed is:

1. An automatic speed control apparatus for controlling running speed of a vehicle at a constant set speed, said vehicle having an internal combustion engine, the speed control apparatus comprising:

means for selectively activating said speed control apparatus;

a surge tank provided with a main intake passage connected to said engine, and having a throttle valve therein; an auxiliary intake passage providing direct communication between portions of the main intake passage upstream and downstream of said throttle valve so as to bypass said throttle valve; an auxiliary intake air valve adapted for controlling a flow rate of air in said auxiliary intake passage; and fuel supply cut-off means for suspending supply of fuel to said engine from completion of a fuel supply cut-off condition until completion of a fuel supply recovery condition;

an actuator means for controlling an opening degree of said throttle valve;

a vehicle speed sensor for sensing an instant running speed of said vehicle;

actuator control means for controlling said actuator means to coincide the sensed vehicle speed with a predetermined set vehicle speed so as to enable said vehicle to run at said set vehicle speed, said actuator control means comprising an actuator chamber in which at least a portion of said actuator means is positioned, a vacuum pump and means for providing communication between said surge tank and said actuator chamber so that said actuator means can be actuated by vacuum in said surge tank; and auxiliary intake air valve control means for controlling said auxiliary intake air valve such that a flow rate of air in said auxiliary intake passage is reduced before said fuel supply cut-off condition is met while said speed control apparatus is activated.

2. An automatic speed control apparatus according to claim 1, wherein said auxiliary intake air valve control means controls said auxiliary intake air valve in such a manner that the flow rate of air in said auxiliary intake passage is decreased progressively.

3. An automatic speed control apparatus according to claim 2, wherein said auxiliary intake air valve control means controls said auxiliary intake air valve when an instant engine speed is higher than a predetermined engine speed which is determined in relation to said fuel supply cut-off engine speed, said predetermined engine speed constituting a factor of said fuel supply cut-off condition.

4. An automatic speed control apparatus according to claim 2, further comprising detecting means for detecting whether a degree of opening of said throttle valve is greater than a minimum degree of opening of said throttle valve, said opening degree of said throttle valve being a factor of said fuel supply cut-off condition, and wherein said auxiliary intake air valve control means controls said auxiliary intake air valve when said detecting means detects that an instant degree of opening of said throttle valve is greater than said minimum degree of opening of said throttle valve.

5. An automatic speed control apparatus according to claim 2, wherein said auxiliary intake air valve control means further controls said auxiliary intake air valve to increase a flow rate in said auxiliary intake passage after said fuel supply recovery condition is sufficed during motion of said vehicle while said speed control apparatus is activated.

6. An automatic speed control apparatus according to claim 1, wherein said auxiliary intake air valve control means controls said auxiliary intake air valve to decrease the flow rate of air in said auxiliary intake passage progressively and finally shut-off completely.

7. An automatic speed control apparatus according to claim 6, wherein said auxiliary intake air valve control means controls said auxiliary intake air valve when an instant engine speed is higher than a predetermined engine speed which is determined in relation to said fuel supply cut-off engine speed, said predetermined engine speed constituting one of the factors of said fuel supply cut-off condition.

8. An automatic speed control apparatus according to claim 6, further comprising detecting means for detecting whether a degree of opening of said throttle valve is greater than a minimum degree of opening of said throttle valve, said opening degree of said throttle valve being a factor of said fuel supply cut-off condition, and wherein said auxiliary intake air valve control means controls said auxiliary intake air valve when said detecting means detects that an instant degree of opening of said throttle valve is greater than said minimum degree of opening of said throttle valve.

9. An automatic speed control apparatus according to claim 6, wherein said auxiliary intake air valve control means further controls said auxiliary intake air valve to increase a flow rate in said auxiliary intake passage after said fuel supply recovery condition is sufficed during motion of said vehicle while said speed control apparatus is activated.

10. An automatic speed control apparatus according to claim 1, wherein said auxiliary intake air valve control means controls said auxiliary intake air valve when an instant engine speed is higher than a predetermined engine speed which is determined in relation to said fuel supply cut-off engine speed, said predetermined engine speed constituting a factor of said fuel supply cut-off condition.

11. An automatic speed control apparatus according to claim 1, further comprising detecting means for detecting whether a degree of opening of said throttle valve is greater than a minimum degree of opening of said throttle valve, said opening degree of said throttle valve being a factor of said fuel supply cut-off condition, and wherein said auxiliary intake air valve control means controls said auxiliary intake air valve when said detecting means detects that an instant degree of opening of said throttle valve is greater than said minimum degree of opening of said throttle valve.

12. An automatic speed control apparatus according to claim 1, wherein said auxiliary intake air valve control means further controls said auxiliary intake air valve to increase a flow rate in said auxiliary intake passage after said fuel supply recovery condition is sufficed during motion of said vehicle while said speed control apparatus is activated.

13. An automatic speed control apparatus according to claim 1, wherein said auxiliary intake air valve includes a valve member capable of varying the cross-sectional area of said auxiliary intake passage and a pulse motor for driving said valve member.

14. An automatic speed control apparatus according to claim 1, wherein a fuel injection control cirucit is provided for controlling fuel injection into said internal combustion engine, and wherein said actuator means comprises a first actuator which includes an accelerator pedal and linkage means connected to said throttle valve, and a second actuator linked to said first actuator, said actuator control means comprising a second actuator chamber in which at least a portion of said second actuator is positioned, a vacuum pump and means for providing communication between said surge tank and said second actuator chamber so that said second actuator can be actuated by vacuum in said surge tank, a vacuum switch disposed between said surge tank and said vacuum pump, and an automatic drive control circuit which receives input from said vacuum switch and which is connected for outputting to said vacuum pump and said second actuator, both said automatic drive control circuit and said fuel injection control circuit simultaneously receiving input from said vehicle speed sensor, said automatic drive control circuit being electrically connected to said fuel injection control circuit..

15. An automatic speed control apparatus according to claim 1, wherein said fuel supply cut-off condition requires that said throttle valve be set at a minimum opening position and that a speed of said engine be higher than a predetermined fuel supply cut-off engine speed.

16. An automatic speed control apparatus according to claim 1, wherein said fuel supply recovery condition requires that said throttle valve be set at a minimum opening position and that a speed of said engine be lower than a predetermined fuel supply recovery engine speed.

17. An automatic speed control apparatus for controlling the running speed of a vehicle at a constant set speed, said vehicle having an internal combustion engine, said speed control apparatus comprising;

a surge tank provided with a main intake passage having a throttle valve therein; an auxiliary intake passage providing direct communication between portions of the main intake passage upstream and downstream of said throttle valve so as to bypass said throttle valve; and auxiliary intake air valve adapted for controlling a flow rate of air in said auxiliary intake passage; and fuel supply cut-off means for suspending supply of fuel to said engine from completion of a fuel supply cut-off condition until completion of a fuel supply recovery condition;

an actuator means for controlling a degree of opening of said throttle valve;

a vehicle speed sensor for sensing an instant running speed of said vehicle;

actuator control means for controlling said actuator means to coincide the sensed vehicle speed with a predetermined set vehicle speed so as to enable said vehicle to run at said set vehicle speed, said actuator control means comprising an actuator chamber in which at least a portion of said actuator means is positioned, a vacuum pump and means for providing communication between said surge tank and said actuator chamber so that said actuator means can be actuated by vacuum in said surge tank; and auxiliary intake air valve control means for controlling said auxiliary intake air valve such that said auxiliary intake valve is fully closed so that a flow rate of air in said auxiliary intake passage becomes substantially zero before said fuel supply cut-off condition is sufficed while said control apparatus is activated.

18. An automatic speed control apparatus according to claim 17, wherein said auxiliary intake air valve control means controls said auxiliary intake air valve when an instant engine speed is higher than a predetermined engine speed which is determined in relation to said fuel supply cut-off engine speed, said predetermined engine speed constituting a factor of said fuel supply cut-off condition.

19. An automatic speed control apparatus according to claim 17, further comprising detecting means for detecting whether a degree of opening of said throttle valve is greater than a minimum degree of opening of said throttle valve, said opening degree of said throttle valve being a factor of said fuel supply cut-off condition, and wherein said auxiliary intake air valve control means controls said auxiliary intake air valve when said detecting means detects that an instant degree of opening of said throttle valve is greater than said minimum degree of opening of said throttle valve.

20. An automatic speed control apparatus according to claim 17, wherein said auxiliary intake air valve control means conducts said control of said auxiliary intake air valve and also controls said auxiliary intake air valve in such a manner that a flow rate in said auxiliary intake passage is increased after said fuel supply recovery condition is met during motion of said vehicle while said speed control apparatus is activated.

21. An automatic speed control apparatus according to claim 17, wherein said auxiliary intake air valve includes a valve member capable of varying a cross-sectional area of said auxiliary intake passage and a pulse motor for driving said valve member.

22. An automatic speed control apparatus according to claim 17, wherein said auxiliary intake air valve control means controls said auxiliary intake air valve in such a manner as to progressively close said auxiliary intake air passage before said auxiliary intake passage is fully closed prior to the fulfillment of said fuel supply cut-off condition.

23. An automatic speed control apparatus according to claim 17, wherein said fuel supply cut-off condition requires that said throttle valve be set at a minimum opening position and that a speed of said engine be higher than a predetermined fuel supply cut-off engine speed.

24. An automatic speed control apparatus according to claim 17, wherein said fuel supply cut-off condition requires that said throttle valve be set at a minimum opening position and that a speed of said engine be higher than a predetermined fuel supply cut-off engine speed.

* * * * *